Dec. 16, 1941.  K. M. ROYER  2,266,336
MOLD FOR PRODUCING BRICK CHEESE
Filed Feb. 7, 1939  2 Sheets-Sheet 1

Inventor
Kenneth M. Royer
By

Attorneys

Dec. 16, 1941.  K. M. ROYER  2,266,336
MOLD FOR PRODUCING BRICK CHEESE
Filed Feb. 7, 1939  2 Sheets-Sheet 2
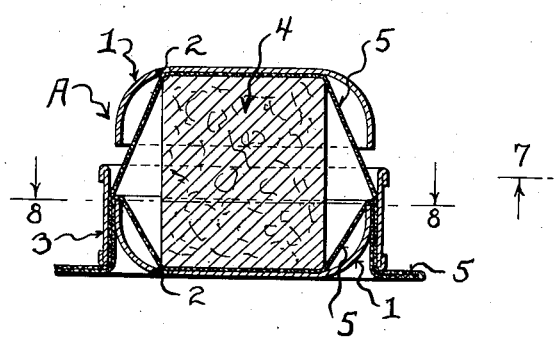
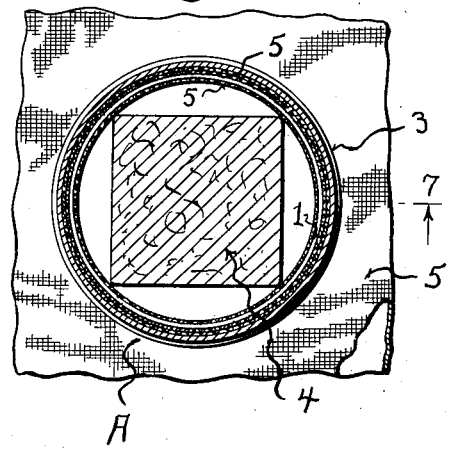
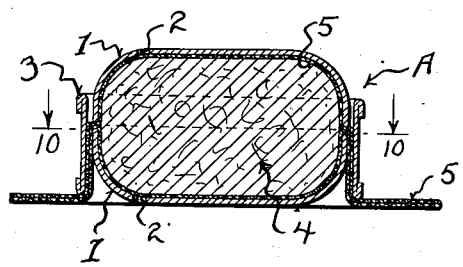
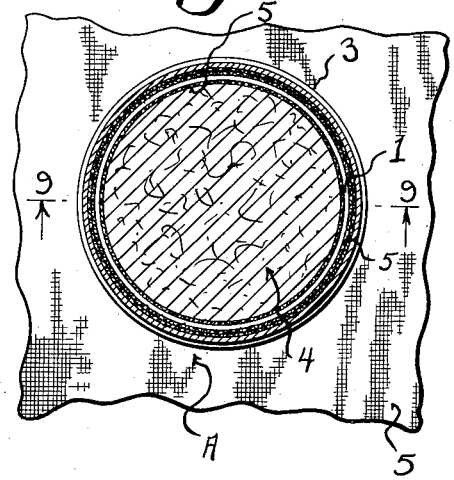
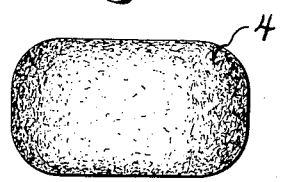
Inventor
Kenneth M. Royer
By
Attorneys Patented Dec. 16, 1941

2,266,336

UNITED STATES PATENT OFFICE 2,266,336

MOLD FOR PRODUCING BRICK CHEESE

Kenneth M. Royer, Mayville, Wis.

Application February 7, 1939, Serial No. 255,034

1 Claim. (Cl. 31—46)

This invention pertains to a novel mold for the production of molded cheese, and has primarily for its object to reduce the number of manual operations heretofore required in the manufacture of certain types of cheese, and the production of cheese of distinctive appearance and shapes, incapable of being made in conventional types of molds now in use.

While certain features of the present invention may be employed in the manufacture of Cheddar cheese, its particular value is found in the production of cheese of the Gouda or Edam type, made from granular curd.

Heretofore, in the making of molded cheese from granular curd, many manual operations have been required, together with extensive handling of the product; and because of the high cost of labor and conditions of manufacturing imposed in this country, most cheese of the foregoing type has been imported from countries in which the industry is carried on in the home by members of the family, under conditions of labor and manufacture which are not serious factors in the cost of production.

The present invention has been designed to meet the foregoing conditions, upon an equal competitive basis, and has more specifically for its object the provision for a mold comprising complementary opposed sections capable of being pressed together within a ring that serves to retain the cheese during the pressing operation, which operation expels the occluded whey and moisture.

With the above and other objects in view, which will appear as the description proceeds, the invention resides in the novel construction, combination, and arrangement of parts, substantially as hereinafter described, and more particularly defined by the appended claim, it being understood that such changes in the precise embodiment of the herein disclosed invention may be made as come within the scope of the claim.

In the accompanying drawings is illustrated one complete example of the physical embodiment of the present invention constructed according to the best mode so far devised for the practical application of the principles thereof.

In the drawings:

Figure 7 is a transverse section through a mold prior to compression of the cheese, the same being taken on the line 7—7 of Figure 8.

Figure 8 is a plan section taken on the line 8—8 of Figure 7.

Figure 9 is a transverse section through the mold upon completion of the pressing operation, the same being taken on the line 9—9 of Figure 10.

Figure 10 is a transverse section taken on the line 10—10 of Figure 9.

Figure 11 is an elevation of a finished cheese.

Figure 1:
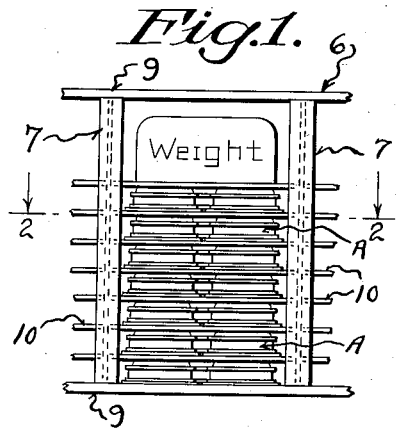
Figure 1 is an elevation of one form of apparatus employed in carrying out the principles of the present invention.

Referring now more particularly to the accompanying drawings, and with reference to the mold A, as best illustrated in Figures 3 to 10, inclusive, the same comprises a pair of complementary cups designated by the numeral 1, and provided with spaced perforations 2, designed to permit the escape of whey and moisture during the pressing operation. An annular band or ring 3 serves to hold the cups 1 in alined position subsequent to initial compression of the cheese, and prior to final compression.

While in the present instance the cups 3 are shown as being round, and provided with a peripheral side wall, arcuate in cross section, it is to be understood that the same may be formed in various shapes and contours to produce cheese of any desired distinctive appearance, as, for instance, heart- or clover-shaped forms, and although the side wall of the cup is shown as arcuate in cross section, the same may be of any other contour, without departing from the invention.

Considering the improved mold contemplated by the invention, for the purpose of explanation one simple process found to produce highly beneficial results will be described.

From the cheese vat the curd is delivered to a large form, in which it is put under pressure for a sufficient period of time, approximately fifteen minutes, to expel the loose whey, and compress the particles of curd into a compact mass. The compressed mass is then cut into cakes of desired shape and size for placing in the individual molds A, heretofore described.

In the use of a round mold, such as shown in the drawings, for convenience the mass of curd is cut into a cube 4 designed to fit into one of the cups 3, as best shown in Figures 7 and 8. In setting up the molds, the lower cup 3 is first lined with a piece of fabric 5, as shown in Figure 7, after which a fold of fabric is placed over the curd. The ring 3 is then forced downwardly around the lower cup to engage the projecting edges of both layers of fabric to bind the same over the edge of the lower cup. A complementary cup 3 is then placed upon the top of the cube, after which the mold is subjected to pressure.

Figure 2:
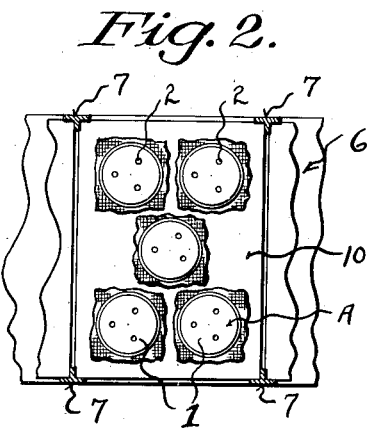
Figure 2 is a transverse section taken on the line 2—2 of Figure 1.
Figure 3:
Figure 3 is an elevation of one of the cups employed in the mold comprising a part of the present invention, the same being partially broken away and in section to more clearly illustrate structural features.
Figure 4:
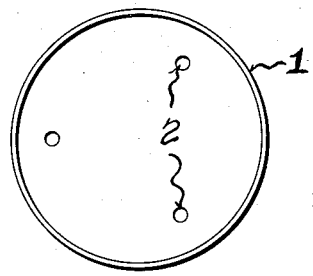
Figure 4 is a plan view of the cup.
Figure 6:
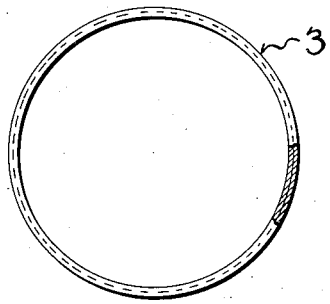
Figure 6 is a plan view of the ring, partially in section.
Figure 5:
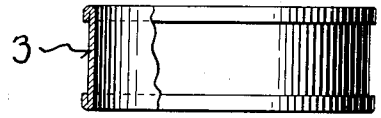
Figure 5 is an elevation of the ring employed in the present mold, the same being partially in section.
Figure 5:

To facilitate the pressing operation, and provide for the pressing of a plurality of molds at one time, a frame 6, such as shown in Figures 1 and 2, is provided, and comprises spaced vertical retaining members 7, of angle iron formation, and connected at their upper and lower ends by horizontal struts 9. A flat plate or tray 10 is then placed between the uprights 7 for reception of a plurality of charged molds, after which another plate is positioned over the molds for reception of additional molds. In this manner the molds are stacked as shown in Figure 1, after which a weight is placed upon the top of the stack to exert pressure upon the molds for a predetermined period, approximately three hours or longer, depending upon the consistency of the curd. During the initial compression of the cheese within the molds, the complementary cups 3 are forced together; but, naturally, upon expansion of the cheese to fill the cups, wrinkling of the fabric results. Therefore, prior to final setting of the cheese, the molds are removed from the pressing frame, and opened for the purpose of straightening the fabric or cloth, after which they are again assembled in the manner heretofore described and placed back in the press for the final pressing operation, which produces a smooth surface on the cheese, and also expels additional moisture. The final compression may be continued for a period of approximately seven hours or more.

The cheese is then removed from the molds and placed in a salt solution for a period of from one to three hours, for the purpose of developing a hardened rind or exterior surface, after which such fins or projections, as may occur upon the periphery of the cheese at the abutting joint of the complementary cups, are trimmed off to provide a smooth exterior surface. The cheese is then stored for curing for a period of approximately seven days, after which it is washed to remove any accumulation of brine. The cheese is then dried, preferably by wiping the same with a cloth, after which it is dipped in a paraffin or wax bath, which may be colored or natural, to seal the cheese for retaining its moisture and aroma. For the purpose of sanitation and appearance, the completed cheese may be wrapped in "Cellophane," or other form of covering, which also serves to protect the cheese against atmospheric conditions.

From the foregoing explanation, considered in connection with the accompanying drawings, it will be seen that an exceedingly simple mold has been provided for producing brick cheese, of a type and form heretofore requiring a greater number of manual operations and extensive handling, and due to the novel type of mold employed, the cheese may be molded in any distinctive shape desired.

Particular attention is directed to the operation of the present mold, which differs from conventional hoops and followers capable of producing only a brick cheese having a flat top and bottom, and of regular contour and shape. To accomplish the purpose of the present invention, it is essential that the mold be so constructed as to permit abutment of the cups, and ready removal of the cheese for the purpose of straightening the fabric and eliminating wrinkles, prior to final compression. Therefore, it will be noted that the height of the band or ring 3, which not only serves to hold the fabric in place, but also prevents expulsion of cheese beyond the cups during compression, is less than the height of the cups in abutted relation. It is, therefore, a simple operation to remove the ring from the cups, after which they can be opened to permit straightening of the cloth prior to final compression and setting of the brick.

In utilizing the present mold it is also important that both the top and lower layers of cloth be locked around one of the cup members due to the initial spaced relation of the top members. Otherwise, during initial compression, the cheese might be expelled beyond the ring, leaving insufficient volume to fill the mold or the cups when finally abutted.

I claim:

A cheese mold comprising, a pair of opposed complementary perforated cups for abutting engagement, a shallow band conforming to the periphery of said cups and of less heighth than the combined depth of said cups, one of said cups being normally stationary in one end of said band and the other slidable in the opposite end for pressing material between the cups, and a layer of fabric forming a liner for each of said cups, the outer edges of both layers being clamped between said shell and the periphery of the stationary cup.

KENNETH M. ROYER.